(12) United States Patent  (10) Patent No.: US 11,582,571 B2
Kumar B et al.  (45) Date of Patent: Feb. 14, 2023

(54) SOUND EFFECT SIMULATION BY CREATING VIRTUAL REALITY OBSTACLE

(71) Applicant: INTERNATIONAL BUSINESS MACHINES CORPORATION, Armonk, NY (US)

(72) Inventors: Dinesh Kumar B, Bangalore (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 17/303,201

(22) Filed: May 24, 2021

(65) Prior Publication Data
US 2022/0377482 A1 Nov. 24, 2022

(51) Int. Cl.
H04S 7/00 (2006.01)
G06F 3/04845 (2022.01)
G06F 3/04847 (2022.01)
G06F 3/16 (2006.01)

(52) U.S. Cl.
CPC .......... *H04S 7/30* (2013.01); *G06F 3/04845* (2013.01); *G06F 3/04847* (2013.01); *G06F 3/16* (2013.01); *H04S 2400/11* (2013.01)

(58) Field of Classification Search
None
See application file for complete search history.

(56) References Cited

U.S. PATENT DOCUMENTS

| 8,036,395 | B2* | 10/2011 | Nagasaka | G09B 23/06 381/62 |
| 2012/0242865 | A1 | 9/2012 | Vartanian | |
| 2013/0236040 | A1* | 9/2013 | Crawford | H04S 7/306 381/310 |

(Continued)

FOREIGN PATENT DOCUMENTS

| CN | 110413799 A | 11/2019 |
| KR | 101975920 B1 | 5/2019 |

(Continued)

OTHER PUBLICATIONS

B, et al., "Sound Effect Simulation by Creating Virtual Reality Obstacle," Application and Drawings, Filed on May 24, 2021, 39 Pages, Related US Patent Application Serial No. PCT/CN2022/086080.

(Continued)

*Primary Examiner* — Qin Zhu
(74) *Attorney, Agent, or Firm* — Robert D. Bean

(57) ABSTRACT

According to one embodiment, a method, computer system, and computer program product for modulating external sounds to reflect the acoustic effects of virtual objects in a mixed-reality environment is provided. The present invention may include creating a knowledge corpus, recording a sound effect occurring externally to a mixed-reality environment experienced by a user operating the mixed-reality device; identifying one or more objects within the mixed-reality environment, including at least one virtual object; modulating the sound effect based on the knowledge corpus (Continued)

to simulate one or more acoustic effects of the one or more objects within the MR environment; and playing the modulated sound effect to the user.

17 Claims, 6 Drawing Sheets

(56) References Cited

U.S. PATENT DOCUMENTS

| | | | | |
|---|---|---|---|---|
| 2015/0283460 | A1* | 10/2015 | Huang | A63F 13/00 |
| | | | | 345/158 |
| 2018/0122043 | A1* | 5/2018 | Energin | G06F 3/017 |
| 2019/0217198 | A1 | 7/2019 | Clark | |
| 2019/0303090 | A1 | 10/2019 | Milne | |
| 2021/0082191 | A1 | 3/2021 | Tajik | |
| 2021/0195360 | A1* | 6/2021 | Leider | G06F 3/167 |
| 2021/0405959 | A1* | 12/2021 | Lovitt | G06F 3/167 |
| 2022/0078572 | A1* | 3/2022 | Bao | A63F 13/54 |

FOREIGN PATENT DOCUMENTS

| | | | |
|---|---|---|---|
| WO | 2019026052 | A1 | 2/2019 |
| WO | 2020231884 | A1 | 11/2020 |
| WO | 2020236356 | A1 | 11/2020 |

OTHER PUBLICATIONS

International Searching Authority, "Notification of Transmittal of the International Search Report and the Written Opinion of the International Searching Authority, or Declaration," Patent Cooperation Treaty, dated Jul. 11, 2022, 9 pages, International Application No. PCT/CN2022/086080.
Berg, "Sound", Encyclopedia Britannica [online], Nov. 5, 2020 [accessed on Apr. 12, 2021], 12 pages, Retrieved from the Internet: <URL: https://www.britannica.com/science/sound-physics>.
Butler, "Augmented Reality and the Coming Integration for Hospitality," Hospitality Net, Jan. 16, 2017 [accessed an Apr. 28, 2021], 6 pages, Retrieved from the Internet: <URL: https://www.hospitalitynet.org/opinion/4080380.html>.
Disclosed Anonymounsly, "Reflection Of Sound And Its Application," Byju's Classes, [accessed on Apr. 12, 2021], 8 pages, Retrieved from the Internet: <URL: https://byjus.com/physics/sound-reflection/>.
Disclosed Anonymously, "Augmented Reality Experiences For Hotels: Innovative AR Ideas For The Lodging Industry," Wikitude.com, Mar. 10, 2020 [accessed on Apr. 28, 2021], 13 pages, Retrieved from the Internet: <URL: https://www.wikitude.com/blog-augmented-reality-experiences-for-hotels-innovative-ar-ideas-for-the-lodging-industry/>.
Disclosed Anonymously, "Hospitality Trends: Augmented Reality (AR)—Hotel Management Software," Roombre.com, [accessed on Feb. 10, 2021], 8 pages, Retrieved from the Internet: <URL: https://roombre.com/en/blog/hotel-technology/hospitality-trends-augmented-reality-ar.html>.
Disclosed Anonymously, "How Virtual Reality can Enrich the Hospitality Industry," Revfine, [accessed on Apr. 28, 2021], 9 pages, Retrieved from the Internet: <URL: https://www.revfine.com/virtual-reality-hospitality-industry/>.
Disclosed Anonymously, "Reflection, Refraction, and Diffraction," The Physics Classroom, [accessed on Apr. 12, 2021], 6 pages, Retrieved from the Internet: <URL: https://www.physicsclassroom.com/class/sound/Lesson-3/Reflection,-Refraction,-and-Diffraction>.
Donovan, "The impact of augmented reality on the hospitality industry," Booking.com, Aug. 28, 2019 [accessed on Apr. 28, 2021], 3 pages, Retrieved from the Internet: <URL: https://partner.booking.com/en-gb/click-magazine/impact-augmented-reality-hospitality-industry>.
Elert, "The Nature of Sound," The Physics Hypertextbook [online], 1998-2021 [accessed on Apr. 12, 2021], 9 pages, Retrieved from the Internet: <URL: https://physics.info/sound/>.
Mell, et al., "The NIST Definition of Cloud Computing", National Institute of Standards and Technology, Special Publication 800-145, Sep. 2011, 7 pages.
Paine, "10 Real Use Cases for Augmented Reality. AR is set to have a big impact on major industries," Inc.com, [accessed on Apr. 28, 2021], 10 pages, Retrieved from the Internet: <URL: https://www.inc.com/james-paine/10-real-use-cases-for-augmented-reality.html>.
Pryor, "How Hotels and Resorts are Adopting Virtual and Augmented Reality," VR Vision, Sep. 27, 2018 [accessed on Apr. 28, 2021], 7 pages, Retrieved from the Internet: <URL: https://vrvisiongroup.com/how-hotels-and-resorts-are-adopting-virtual-and-augmented-reality/>.
Schechter, "The Ultimate Guide to Markeriess Augmented Reality," Marxent 3D Commerce, May 9, 20214 (Oct. 20, 2020) [accessed on Apr. 28, 2021], 12 pages, Retrieved from the Internet: <URL: https://www.marxentlabs.com/what-is-markerless-augmented-reality-dead-reckoning/>.
Terry, "Augmented Reality Technology Helps Hotels Stand Out," Insights, Sep. 12, 2016 [accessed on Apr. 28, 2021], 8 pages, Retrieved from the Internet: <URL: https://insights.samsung.com/2016/09/12/augmented-reality-technology-helps-hotels-stand-out/>.
Wang, "The Role of Augmented Reality Audio," Jabil.com, [accessed on Apr. 28, 2021], 7 pages, Retrieved from the Internet: <URL: https://www.jabil.com/blog/sound-in-augmented-and-virtual-reality.html>.
Wikipedia, "Sound", Wikipedia, the free encyclopedia, [accessed on Apr. 12, 2021], 12 Pages, Retrieved from the Internet: <URL: https://en.wikipedia.org/wiki/Sound>.

* cited by examiner

SOUND EFFECT SIMULATION BY CREATING VIRTUAL REALITY OBSTACLE

BACKGROUND

The present invention relates, generally, to the field of computing, and more particularly to mixed reality.

Mixed reality is a field concerned with merging real and virtual worlds such that physical and digital objects co-exist and interact in real time. Mixed reality does not exclusively take place in either the physical or virtual worlds but is a hybrid of reality and virtual reality; as such, mixed reality describes everything in the reality-virtuality continuum except for the two extremes, namely purely physical environments and purely virtual environments. Accordingly, mixed reality includes augmented virtuality (AV), augmented reality (AR) and virtual reality (VR). Mixed reality has found practical applications in remote working, military and commercial training, games, and hybrid amusement-park-style rides.

SUMMARY

According to one embodiment, a method, computer system, and computer program product for modulating external sounds to reflect the acoustic effects of virtual objects in a mixed-reality environment is provided. The present invention may include creating a knowledge corpus, recording a sound effect occurring externally to a mixed-reality environment experienced by a user operating the mixed-reality device; identifying one or more objects within the mixed-reality environment, including at least one virtual object; modulating the sound effect based on the knowledge corpus to simulate one or more acoustic effects of the one or more objects within the MR environment; and playing the modulated sound effect to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
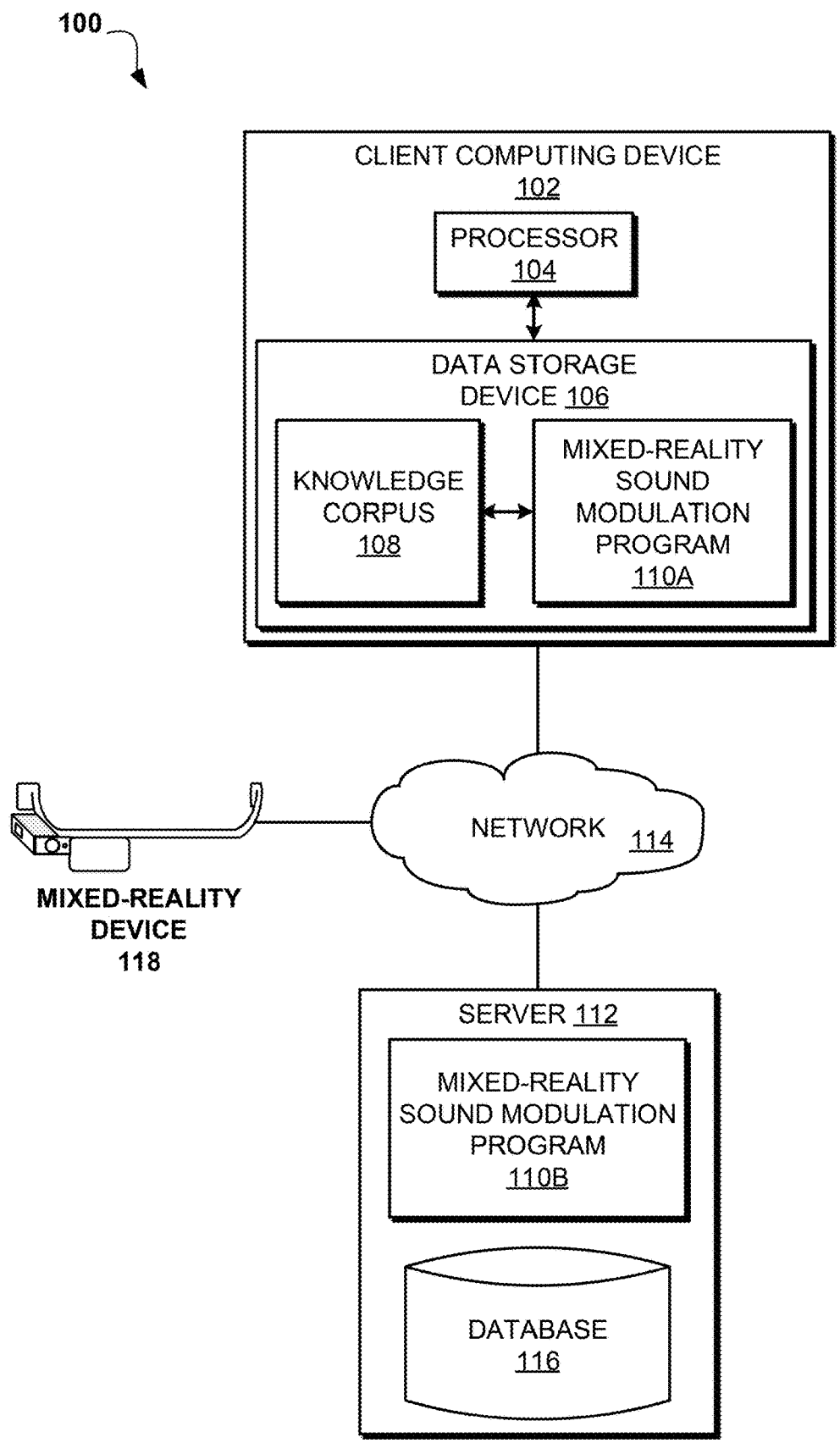
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to mixed reality. The following described exemplary embodiments provide a system, method, and program product to, among other things, modulate a sound effect occurring externally to a mixed-reality environment to reflect the combined virtual and physical conditions of the mixed-reality environment. Therefore, the present embodiment has the capacity to improve the technical field of mixed reality by improving the fidelity of sounds perceived by the user within the mixed-reality environment, particularly with regard to sounds occurring externally to the mixed-reality environment, thereby improving immersion within the mixed-reality environment and the accuracy of simulation within the mixed-reality environment.

As previously described, mixed reality is a field concerned with merging real and virtual worlds such that physical and digital objects co-exist and interact in real time. Mixed reality does not exclusively take place in either the physical or virtual worlds but is a hybrid of reality and virtual reality; as such, mixed reality describes everything in the reality-virtuality continuum except for the two extremes, namely purely physical environments and purely virtual environments. Accordingly, mixed reality includes augmented virtuality (AV), augmented reality (AR) and virtual reality (VR). Mixed reality has, for example, found practical applications in remote working, military and commercial training, games, and simulation.

Mixed reality presents its own unique challenges; sounds occurring in any environment are changed and distorted by, for example, the presence, shape, and material composition of obstacles in the environment, the properties of the media through which the sound is being transmitted, and the relative distances between the source of the sound, obstacles and surfaces, and the user or device perceiving the sound. A mixed-reality environment comprises virtual elements as well as physical elements; the effect of these virtual elements must be taken account in addition to the effect of the physical elements to ensure that sound played to the user accurately reflects the environment experienced by the user, and preserve the immersion of the user's mixed-reality experience. However, currently, mixed reality experiences only modulate sounds created by the mixed-reality software running the mixed-reality experience. As a result, music playing on background applications, voices originating from background chat applications or people physically close to the user, et cetera, may sound jarring and unnatural within the mixed-reality environment of the user, pulling the user out of the experience and lessening his or her enjoyment. Additionally, without a method of simulating the effects of virtual and physical elements on a sound, a user wishing to hear the effect of different environmental obstacles on a sound must construct those obstacles in the physical world, or must construct a detailed simulation that cannot be easily modified to reflect dynamic changes to the environment such as the addition or subtraction of virtual elements.

As such, it may be advantageous to, among other things, implement a system that, for example, records sound effects occurring externally to the user's mixed-reality environment and modulates the sound to accurately reflect both the physical and virtual elements within a mixed-reality environment; enables a user to create virtual objects in a mixed-reality environment and hear how sound changes based on the added virtual objects; and allows multiple participating users in any multi-user mixed-reality collaborative surrounding to place and position different types of virtual objects in the mixed-reality collaborative surroundings, and accordingly alters the effect of sound generated in the surroundings. It may be advantageous to implement such a system within a mixed-reality environment to improve the ease with which a user may place and position virtual objects to hear changes in the sounds. Such a system may enable a user to perceive sounds as if they were occurring in the mixed reality environment inhabited by the user, which provides many potential advantages: for example, the system might allow a user to accurately preview the acoustic properties of rooms in a property, even simulating the acoustic properties of the user's belongings placed virtually within the property, before putting in a bid on the property. The system may allow users to preview the acoustic properties of destinations, and to learn how different objects and materials affect sound by creating virtual objects of different sizes, positions, shapes, and compositions. The system may allow groups of users to collaboratively place objects within a mixed-reality space and hear how sounds are affected.

According to one embodiment, the invention is a system for recording a sound effect occurring externally to a mixed-reality environment experienced by a user wearing a mixed-reality headset, modulating the sound effect to reflect the presence of virtual and physical objects within the mixed-reality environment, and playing the modulated sound effect to the user.

According to at least one embodiment, the invention is a system for enabling a user to create or position virtual objects within a mixed-reality environment experienced by the user, dynamically modulating a sound effect occurring externally to the mixed reality environment to account for the acoustic effects of the virtual objects on the sound, and playing the modulated sound to the user.

According to at least one embodiment, the invention is a system for enabling a user to modify the mixed-reality environment experienced by the user, dynamically modulating a sound effect occurring externally to the mixed reality environment to account for the acoustic effects of the modified mixed-reality environment, and playing the modulated sound to the user.

In some embodiments of the invention, the sound effect may be any sound occurring externally to the mixed-reality environment. For example, the sound effect may be a sound occurring in the physical environment of the user, near enough or loud enough that the user would be able to hear it with the unaided ear. The sound effect may be a sound occurring in the virtual environment of the user, but not part of the mixed-reality environment; for example, the sound may be music or voice chat emanating from applications separate from the application generating the mixed-reality environment that the user is currently immersed in. In some embodiments, for example where there are multiple collaborating users, the sound effect may be occurring in the vicinity of at least one user.

As referred to herein, the physical environment of the user may be the real-world surroundings of the user, comprised of all the physical elements of the user's location such as the earth, the air, the sky, physical objects such as trees, furniture, animals, people, et cetera. The virtual environment may be the virtual surroundings of the user, which is to say all virtual elements, including virtual objects, rendered by a processor on specialized display hardware that a user can see and/or interact with. Virtual objects may be an object of any shape, size, position, material composition, et cetera, often mimicking or simulating a physical object, that is simulated via software within the virtual environment, such as visual interfaces of applications, computer-generated text or symbols or pictures or objects overlaid onto the user's sight, a game environment that the user is viewing through a headset, et cetera.

The mixed reality environment may be an environment experienced by one or more users through devices such as VR headsets, smart glasses, tablets, mobile phones, et cetera, which comprises a mix of the user's physical and virtual environments; the mixed reality environment may be any combination of both virtual and physical elements. The virtual elements within a mixed-reality experience may include the digital components of the virtual experience that are modelled in a virtual environment which may be mapped to or otherwise correspond with places and objects within the physical world, including virtual scenes and augmented reality elements such as safety instructions, advertisements, navigational instructions, virtual signage, et cetera; the virtual elements may be interactive, responding to a participant's movement, speech, orientation, et cetera. The ratio of virtual elements to physical elements may vary considerably; for example, on one end of the spectrum, the mixed reality experience may be largely virtual with minimal physical elements, such as an interactive virtual environment mapped to a physical location such that the movement of one or more participants in the virtual environment is mapped to their location and movement in the physical world. On the other end of the spectrum, a mixed reality experience may be largely physical with minimal virtual elements, such as virtual navigational aids overlaid onto the physical environment of the user.

In some embodiments of the invention, the virtual object may be created by the user, and existing virtual objects may be edited; editing may include changing the shape, size, position, material composition, and other properties of the virtual object. In some embodiments, for example where there are multiple collaborating users, any number of users may create or edit virtual objects, and may perceive the virtual objects created by any or all other users participating in the collaborative multi-user environment, and each individual participating user may hear sound effects occurring within their own external environment and/or originating from external virtual and/or physical environments of all or a subset of other collaborating users.

In some embodiments of the invention, acoustic effects may be the properties of an object and/or material that govern how that object and/or material responds to sound waves. The system may simulate acoustic effects of a virtual object by changing the sound effect based on the material, shape, and position attributed to the virtual object and the location of the source of the sound effect, the location of the user relative to the object and the virtual object, et cetera, such that the sound effect sounds to the user as it would if the virtual object were physical.

In some embodiments of the invention, the user may modify the mixed-reality environment by changing the setting, where the setting comprises virtual elements such as the time, geography, terrain features, and/or structures comprising the visible surroundings of the user. For example, the user may be physically located in the living room of the user's home, but the user may modify the setting of the mixed-reality environment to be a hilly outdoor area, so that the sound may be modulated to reflect a hilly outdoor area. In some embodiments, the user may modify the mixed-reality environment by changing the conditions, where the conditions may be circumstances modifying the setting and changing the acoustic conditions, such as the presence and severity of weather events, atmospheric conditions such as humidity, whether the setting is underwater, et cetera.

In some embodiments of the invention, the mixed-reality environment may be a multi-user collaborative environment, where multiple participating users may collaboratively place and position different types of virtual objects, and allows all or a subset of participating users to hear sounds external to the multi-user collaborative environment modulated to reflect the virtual objects within the multi-user collaborative environment. In some embodiments, the multiple participating users may modify the mixed reality environment by changing the setting and/or conditions.

In some embodiments of the invention, the user may select a sample sound effect, and the system may graphically represent to the user within the mixed-reality environment what changes must be applied to the current surrounding to achieve a matching sound effect. For example, a user may desire a selected sound effect, such as a recording of the user saying "hello," in her living room; the system may display what changes must be applied to the living room, such as changing the position of sofa, changing the wall direction, and adding a thicker carpet, so that a similar or matching sound effect can be created. The system may display the changes within the mixed reality environment by creating virtual objects to represent new or moved objects within the surroundings and may remove virtual objects and/or may mask physical objects that are to be removed or repositioned.

In some embodiments of the invention, the system may create a knowledge corpus, where the knowledge corpus is a body of knowledge accessible to the system that comprises general knowledge about sound properties, sound reflection, properties of reflection and associated physics, including acoustic properties of different materials, sound transmission media, shapes and sizes of surfaces and obstacles, changes in sound propagation over distances, et cetera. The system may consult the knowledge corpus to modulate the sound. In some embodiments, the knowledge corpus may include specific data regarding the effects of particular objects, settings, conditions, et cetera on particular sounds based on historical data and real-world examples, for example provided by the system as feedback.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to modulate a sound effect occurring externally to a mixed-reality environment to reflect the combined virtual and physical conditions of the mixed-reality environment.

Referring to FIG. 1, an exemplary networked computer environment 100 is depicted, according to at least one embodiment. The networked computer environment 100 may include client computing device 102, mixed-reality device 118, and a server 112 interconnected via a communication network 114. According to at least one implementation, the networked computer environment 100 may include a plurality of client computing devices 102, mixed-reality devices 118, and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a knowledge corpus 108 and a mixed-reality sound modulation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. In some embodiments, client computing device 102 may be a mixed reality device 118 and/or may be integrated into a mixed reality device 118. As will be discussed with reference to FIG. 5, the client computing device 102 may include internal components 502a and external components 504a, respectively.

Mixed reality (MR) device 118 may be any device which allows a user to perceive a mixed reality environment; the mixed reality device 118 may be any device equipped with a display that can render a virtual environment, and hardware or software that enables the device to track its location and motion relative to the physical world, and by extension relative to virtual objects mapped to locations in the physical world. The mixed reality device 118 may be a general-purpose device owned by users or may be customized or specialized for an individual mixed reality experience or class of mixed reality experiences. Mixed reality devices 118 may include such devices as VR headsets, AR headsets, smart glasses, tablets, mobile phones, et cetera. Users may wear or utilize mixed reality devices 118 while experiencing the mixed reality environment. Mixed reality device 118 may be enabled to communicate with user experience orchestrator program 110A, 110B residing within client computing device 102 and/or server 112 via the communication network 114, in accordance with one embodiment of the invention.

In some embodiments of the invention, mixed-reality device 118 or client computing device 102 may be equipped with, or in communication with, one or more microphones for recording sounds occurring within the physical environment of the user. The microphones may be positioned within the general vicinity of the user, for example integrated into a headset or mobile device on the person of the user, such that a sound recorded by the microphone is a sound that would be audible to the user's naked ears, whether or not the user actually hears the sound.

In some embodiments of the invention, mixed-reality device 118 or client computing device 102 may be equipped with, or in communication with, one or more speakers for playing modulated sounds to the user. The speakers may be devices fitted in or proximate to the user's ear so that sounds may be played directly to the user. In some embodiments of the invention, the speakers may be equipped with active or passive noise dampening features, such as sound insulation or noise-cancelling technologies, to reduce the likelihood of a user hearing sounds occurring in the user's physical environment, so that the user is able to hear modulated versions of such sounds played through the speakers.

The server computer 112 may be a laptop computer, netbook computer, personal computer (PC), a desktop computer, or any programmable electronic device or any network of programmable electronic devices capable of hosting and running a mixed-reality sound modulation program 110B and a database 116 and communicating with the client computing device 102 via the communication network 114, in accordance with embodiments of the invention. As will be discussed with reference to FIG. 5, the server computer 112 may include internal components 502*b* and external components 504*b*, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the mixed-reality sound modulation program 110A, 110B may be a program capable of modulate a sound effect occurring externally to a mixed-reality environment to reflect the combined virtual and physical conditions of the mixed-reality environment. The mixed-reality sound modulation program 110A, 110B may be located on client computing device 102 or server 112 or on any other device located within network 114. Furthermore, mixed-reality sound modulation program 110A, 110B may be distributed in its operation over multiple devices, such as client computing device 102, mixed-reality device 118 and/or server 112. The mixed-reality sound modulation method is explained in further detail below with respect to FIG. 2.

Figure 2:
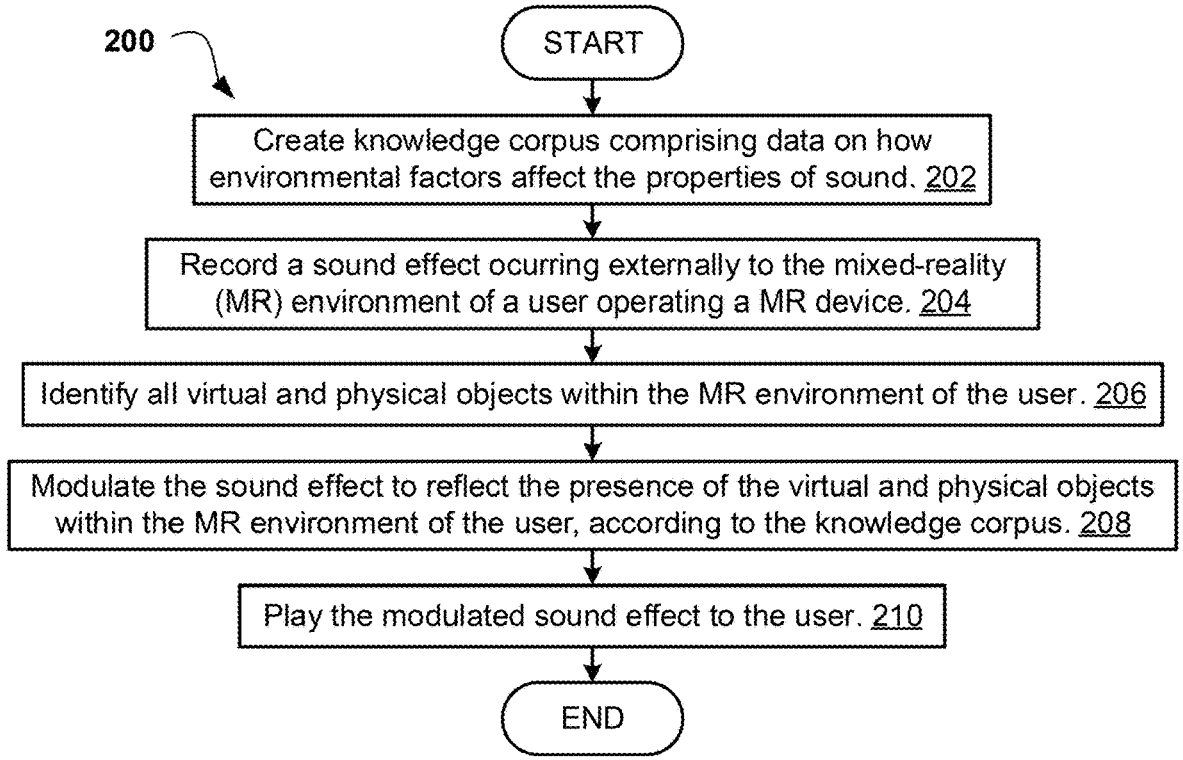
FIG. 2 is an operational flowchart illustrating a mixed-reality sound modulation process according to at least one embodiment.

Referring now to FIG. 2, an operational flowchart illustrating a mixed-reality sound modulation process 200 is depicted according to at least one embodiment. At 202, the mixed-reality sound modulation program 110A, 110B creates a knowledge corpus 108 comprising data on how environmental factors affect the properties of sound. The knowledge corpus 108 may be a body of knowledge accessible to the mixed-reality sound modulation program 110A, 110B that comprises general knowledge about sound properties, sound reflection, properties of reflection and associated physics, including acoustic properties of different materials, sound transmission media, shapes and sizes of surfaces and obstacles, changes in sound propagation over distances, et cetera. In some embodiments, the knowledge corpus 108 may include specific data regarding the effects of particular objects, settings, conditions, et cetera on particular sounds based on historical data and real-world examples, for example provided by the mixed-reality sound modulation program 110A, 110B as feedback. In some embodiments of the invention, the mixed-reality sound modulation program 110A, 110B may create a knowledge corpus 108 by storing such general and specific data, or the knowledge corpus 108 may be pre-provided to the mixed-reality sound modulation program 110A, 110B. In some embodiments of the invention, the knowledge corpus 108 may comprise a machine learning algorithm that uses a knowledge base to sense patterns and extrapolate how a sound effect would interact with a virtual object.

At 204, the mixed-reality sound modulation program 110A, 110B records a sound effect occurring externally to the mixed reality (MR) environment of a user operating an MR device. The sound effect may be any sound occurring externally to the mixed-reality environment. For example, the sound effect may be a sound occurring in the physical environment of the user, near enough or loud enough that the user would be able to hear it with the unaided ear, such as speech from the user or others in proximity to the user. The sound effect may be a sound occurring in the virtual environment of the user, but not part of the mixed-reality environment; for example, the sound may be music or voice chat emanating from applications separate from the application generating the mixed-reality environment that the user is currently immersed in. In some embodiments, for example where there are multiple collaborating users, the sound effect may be occurring in the vicinity of at least one user. The mixed-reality sound modulation program 110A, 110B may record the sound effect with, for example, a microphone integrated into the virtual reality device 118 or client computing device 102.

At 206, the mixed-reality sound modulation program 110A, 110B identifies all virtual and physical objects within the MR environment of the user. The mixed-reality sound modulation program 110A, 110B may identify virtual objects by receiving information from the program that is creating the mixed reality environment regarding the virtual objects. The mixed-reality sound modulation program 110A, 110B may identify physical objects by using object recognition to identify physical objects within images recorded by cameras mounted on the person of the user, for example mounted in the mixed-reality headset or a phone. The mixed-reality sound modulation program 110A, 110B may also use any other method to identify physical objects in the environment of the user, such as sonar, lidar, et cetera. In some embodiments of the invention, the mixed-reality sound modulation program 110A, 110B may identify all virtual and/or physical objects within a threshold distance of the user, where the threshold distance may represent a distance at which sounds audible to the user may be affected by the acoustic properties of the objects within the threshold distance. In some embodiments of the invention, the mixed-reality sound modulation program 110A, 110B may only identify physical objects in the mixed reality environment of the user where the sound effect originates from the virtual environment of the user, for example where the sound effect is music or voices from background applications, which would not be naturally affected by physical objects in the user's physical environment as a sound originating from the user's physical environment would be.

In some embodiments of the invention, the mixed-reality sound modulation program 110A, 110B may continuously identify virtual and/or physical objects within the MR environment of the user to preserve an updated map of the user's mixed-reality surroundings, for example by identifying objects at a regular time interval such as every second. In some embodiments of the invention, mixed-reality sound modulation program 110A, 110B may identify virtual and/or physical objects within the MR environment in response to a change in the objects within the user's MR environment; for example, whenever a user creates, deletes, or edits a virtual object, modifies the setting or a condition, moves around beyond a threshold margin such that physical and virtual objects are at new locations relative to the user, changes a physical object such as by moving the object or changing its shape, orientation, color, et cetera. In at least such an embodiment, the mixed-reality sound modulation program 110A, 110B may continuously monitor the mixed reality environment for physical or virtual changes, and may use location tracking methods such as an accelerometer, RFID tags, GPS, camera-based object and facial detection, et cetera to track the location and movement of the mixed-reality device 118 and/or the user.

At 208, the mixed-reality sound modulation program 110A, 110B modulates the recorded sound effect to reflect the presence of the virtual and physical objects within the MR environment of the user, according to the knowledge corpus 108. The mixed-reality sound modulation program 110A, 110B may modulate the recorded sound effect by altering the amplitude or frequency of the sound effect to reflect the presence of the virtual and/or physical objects in the mixed-reality environment of the user. In some embodiments of the invention, the mixed-reality sound modulation program 110A, 110B may alternatively or additionally modulate the sound effect to represent the setting or conditions present within the mixed reality environment. The mixed-reality sound modulation program 110A, 110B may consult the knowledge corpus 108 to determine how the sound would be affected by the presence of the virtual and/or physical objects, settings, and/or conditions. In some embodiments of the invention, mixed-reality sound modulation program 110A, 110B may modulate the sound effect in response to a change in the objects within the user's MR environment; for example, whenever a user creates or edits a virtual object, modifies the setting or a condition, moves around beyond a threshold margin such that physical and virtual objects are at new locations relative to the user, changes a physical object such as by moving the object or changing its shape, orientation, color, et cetera.

At 210, the mixed-reality sound modulation program 110A, 110B plays the modulated sound effect to the user. Here, mixed-reality sound modulation program 110A, 110B plays the modulated sound effect through the speakers to the user. In some embodiments of the invention, such as where multiple users are within the same virtual environment, for example in a multi-user collaborative environment, the mixed-reality sound modulation program 110A, 110B may play the modulated sound effect to a subset of users based on individual user preferences. For example, users within the same physical environment may opt to hear modulated sound effects originating from that environment and may opt not to hear sound effects originating from other users' physical and/or virtual environments.

Figure 3:
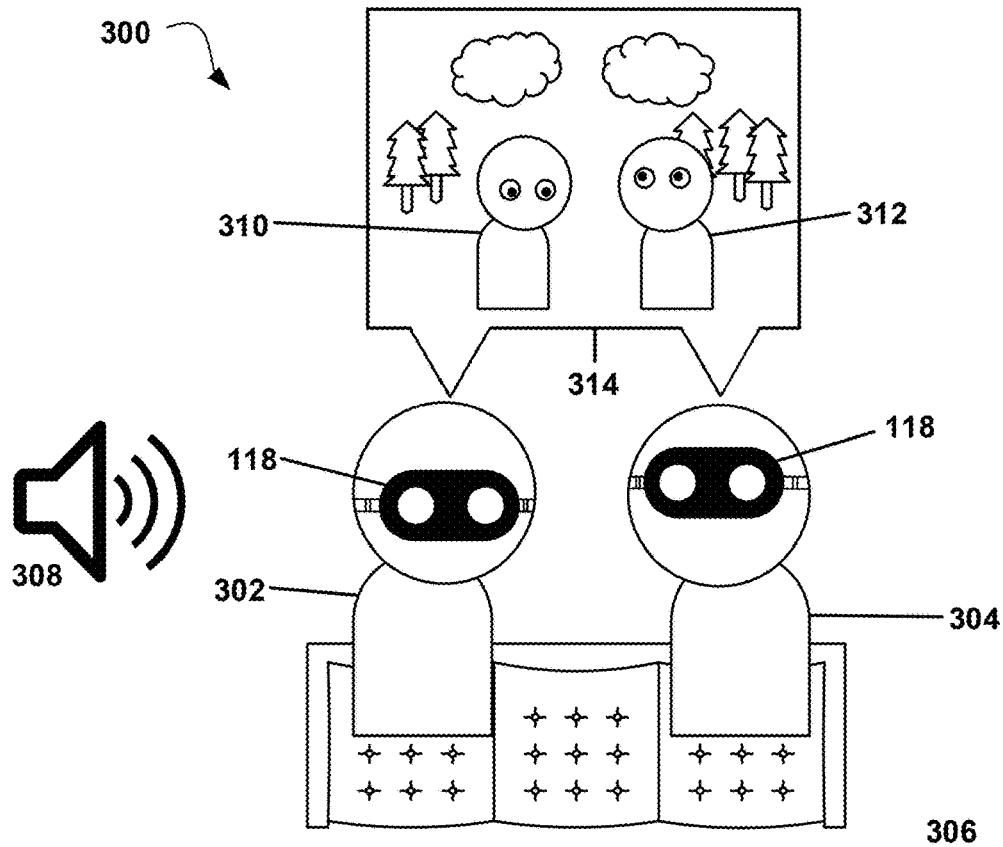
FIG. 3 is a diagram illustrating a use case of a mixed-reality sound modulation system according to at least one embodiment.

Referring now to FIG. 3, a diagram illustrating a use case 300 of a mixed-reality sound modulation system is depicted, according to at least one embodiment. Here, a first user 302 and second user 304, each equipped with a mixed reality device 118, are sitting within a physical environment 306, a living room, but are experiencing a mixed-reality environment 314, which is an expansive outdoor landscape. In this mixed-reality landscape 314, first user 302 is represented by a virtual avatar 310 and second user 304 is represented by a virtual avatar 312. A sound effect 308 occurs in the physical environment 306 of the users 302 and 304. The sound effect 308 may be the first user 302 talking to the second user 304; in the physical environment 306, sound effect 308 does not echo because it is an indoor space. However, the mixed-reality environment 314 is outdoors, so mixed-reality sound modulation program 110A, 110B modulates the sound so that second user 304 hears first user 302's voice with an echo.

Figure 4A:
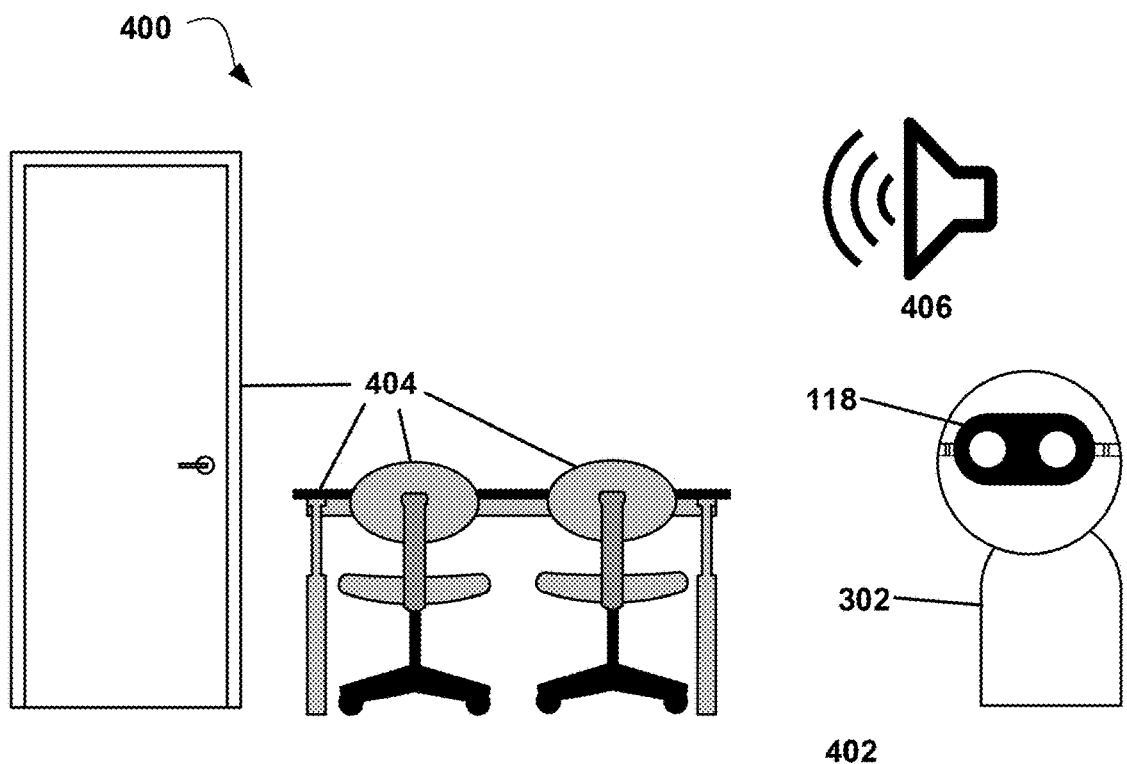
FIG. 4A is a diagram illustrating a use case of a mixed-reality sound modulation system according to at least one embodiment.

Referring now to FIG. 4A, a diagram illustrating a use case 400 of a mixed-reality sound modulation system is depicted, according to at least one embodiment. Here, a user 302 equipped with a mixed-reality device 118 is experiencing a mixed-reality environment 402, which comprises a collection of physical objects 404, including a door, table, and two chairs. A sound effect 406 is played in the physical environment of the user 302, and the mixed-reality sound modulation program 110A, 110B modulates the sound effect 406 based on the physical objects 404 in the mixed-reality environment 402 and plays the modulated sound effect 406 to the user.

Figure 4B:
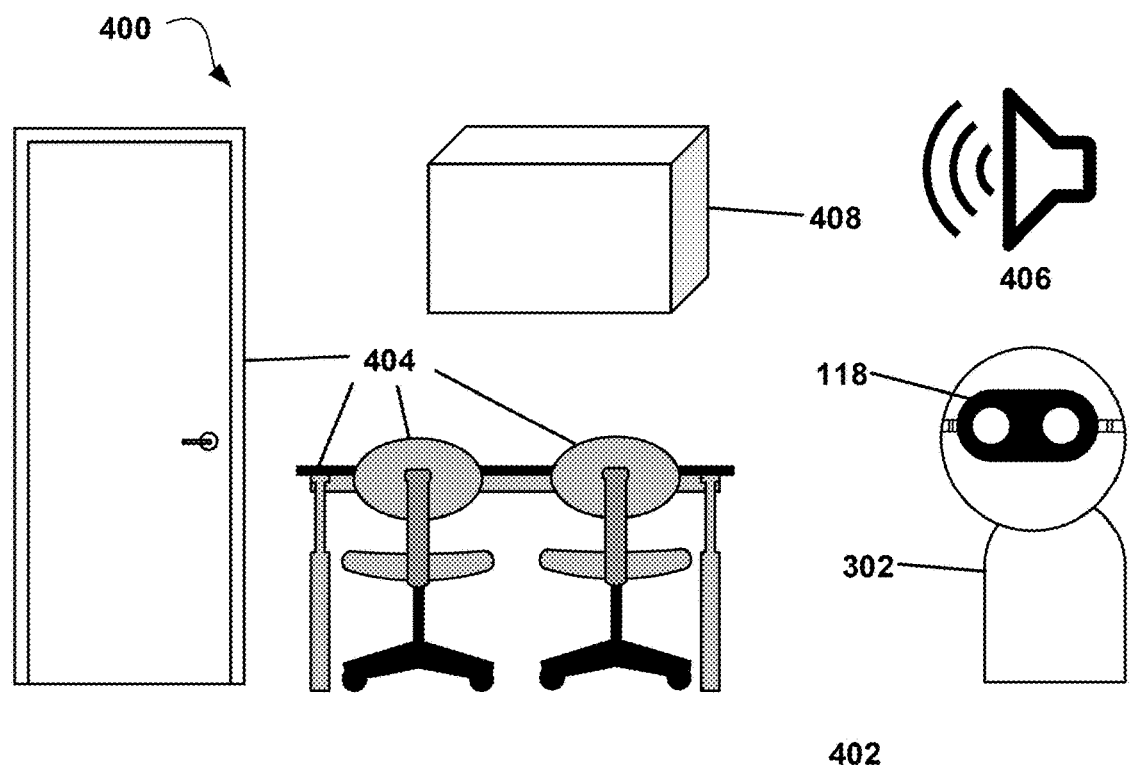
FIG. 4B is a diagram illustrating a use case of a mixed-reality sound modulation system according to at least one embodiment.

Referring now to FIG. 4B, the user 302 has added a virtual object 406 to the mixed-reality environment 402. The sound effect 406 is played in the physical environment of the user 302, and the mixed-reality sound modulation program 110A, 110B modulates the sound effect 406 based on the physical objects 404 as well as the virtual object 408 in the mixed-reality environment 402 and plays the modulated sound effect 406, which reflects the addition of the virtual object 408 to the mixed-reality environment 402, to the user 302.

In an alternate example, the user 302 may select a sample sound effect 406 from a list of sound effects that have already been modulated based on particular environments; mixed-reality sound modulation program 110A, 110B may identify the mixed reality environment associated with sample sound effect 406, for example by accessing the environment present when mixed-reality sound modulation program 110A, 110B originally modulated sound effect 406 or by analyzing the modulation of sound effect 406 to determine what virtual and physical objects, conditions, and/or settings must have been present in the mixed reality environment of sound effect 406 to produce the modulation. The mixed-reality sound modulation program 110A, 110B may determine that a virtual object 408 of a particular size and shape must be added to the mixed reality environment 402 of the user to make it match the mixed-reality environment that sound effect 406 was originally modulated to match, and may accordingly create virtual object 408.

It may be appreciated that FIGS. 2-4 provide only illustrations of one implementation and do not imply any limitations with regard to how different embodiments may be implemented. Many modifications to the depicted environments may be made based on design and implementation requirements.

Figure 5:
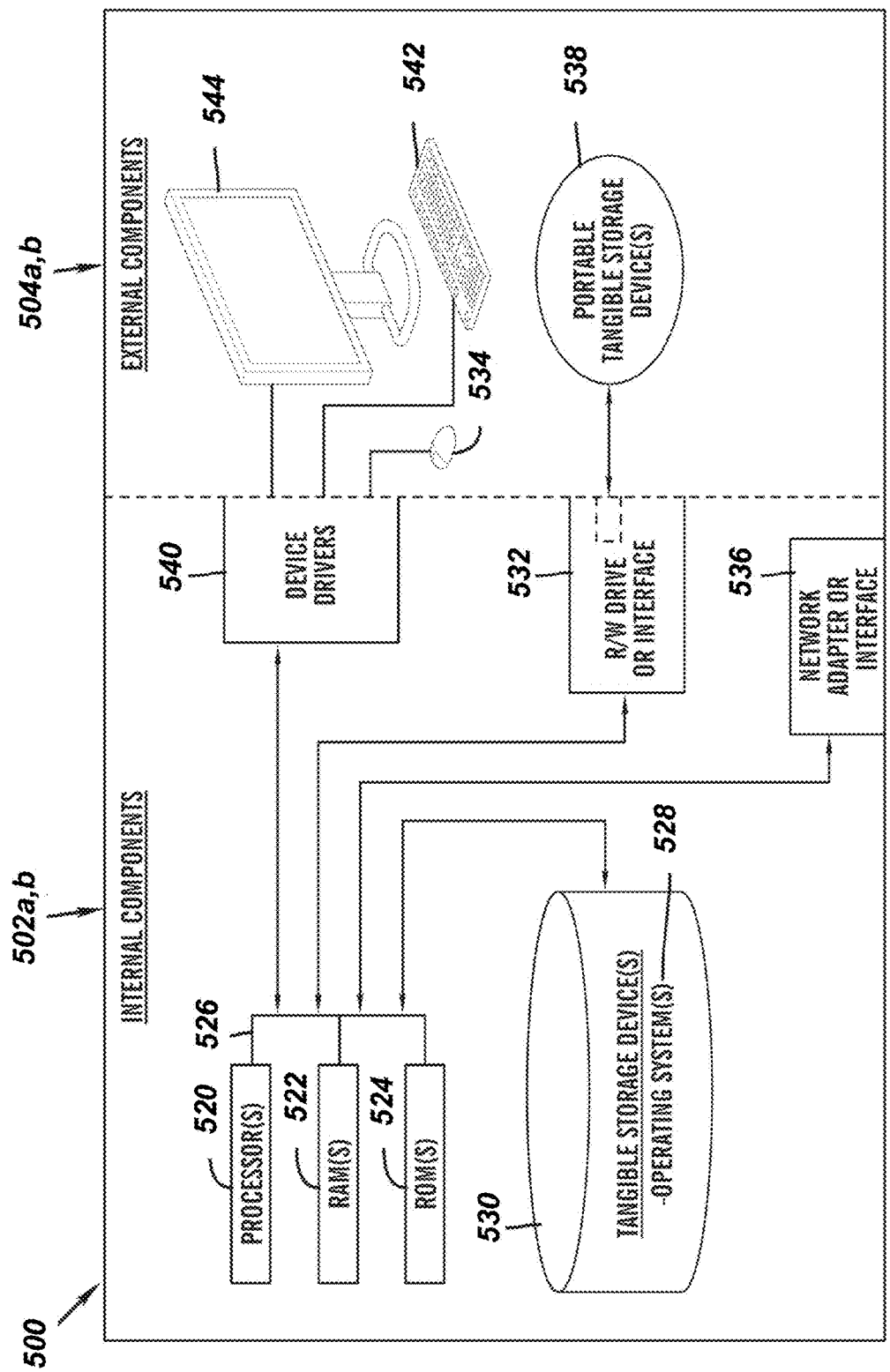
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the mixed-reality sound modulation program 110A in the client computing device 102, and the mixed-reality sound modulation program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the mixed-reality sound modulation program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the mixed-reality sound modulation program 110A in the client computing device 102 and the mixed-reality sound modulation program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the mixed-reality sound modulation program 110A in the client computing device 102 and the mixed-reality sound modulation program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
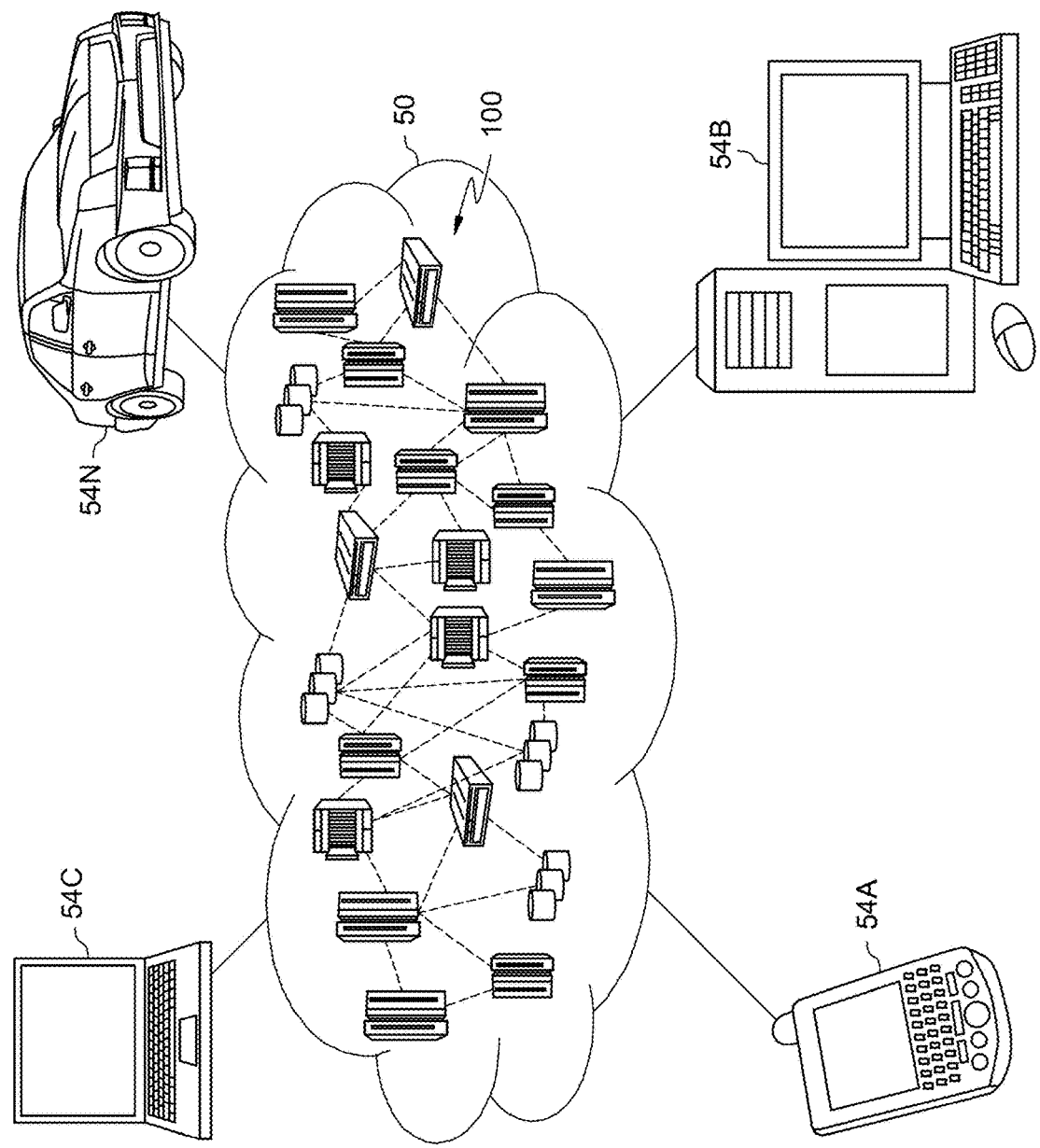
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
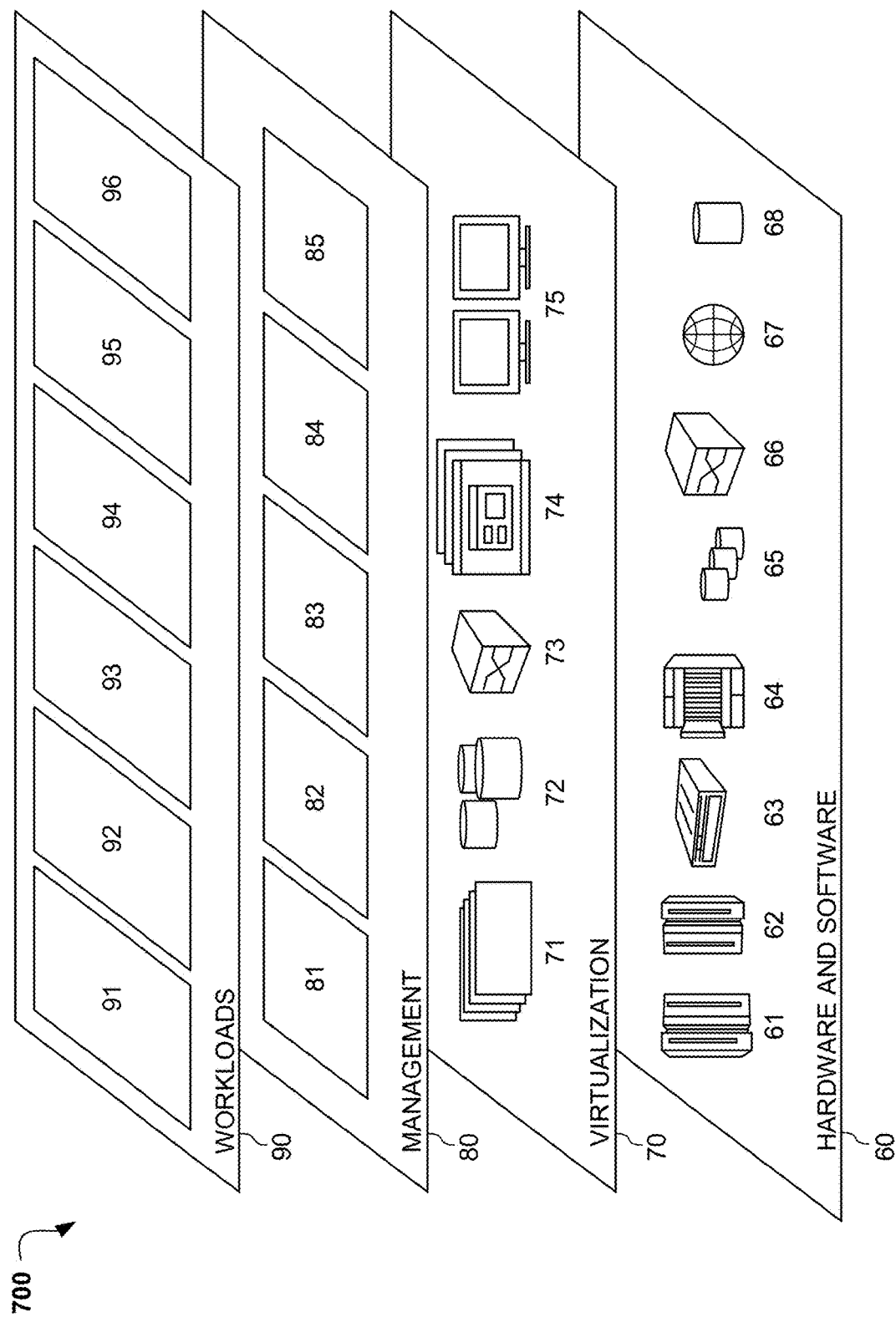
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mixed-reality sound modulation 96. The mixed-reality sound modulation 96 may be enabled to modulate a sound effect occurring externally to a mixed-reality environment to reflect the combined virtual and physical conditions of the mixed-reality environment.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for operating a mixed-reality device, the method comprising:
   recording a sound effect occurring externally to a mixed-reality environment experienced by a user operating the mixed-reality device;
   identifying one or more objects within the mixed-reality environment, including at least one virtual object;
   modulating the sound effect to simulate one or more acoustic effects of the one or more objects within the mixed-reality environment;
   graphically representing to the user, within the mixed-reality environment, one or more changes necessary to configure the mixed-reality environment to reproduce a user-selected sample sound; and
   playing the modulated sound effect to the user.

2. The method of claim 1, wherein the modulating is performed dynamically in response to the virtual object being created or edited by the user.

3. The method of claim 1, further comprising:
   modulating the sound effect to simulate one or more acoustic effects of a setting or condition of the mixed-reality environment modified by the user.

4. The method of claim 3, wherein the modulating is performed dynamically in response to the user modifying the setting or condition of the mixed-reality environment.

5. The method of claim 1, wherein the mixed-reality environment comprises a multi-user collaborative environment, and wherein a plurality of participating users are enabled to position or edit the at least one virtual object.

6. The method of claim 1, wherein the modulating is based on a created knowledge corpus.

7. A computer system for operating a mixed-reality device, the computer system comprising:
one or more mixed-reality devices, one or more microphones, one or more speakers, one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
recording a sound effect occurring externally to a mixed-reality environment experienced by a user operating the mixed-reality device;
identifying one or more objects within the mixed-reality environment, including at least one virtual object;
modulating the sound effect to simulate one or more acoustic effects of the one or more objects within the mixed-reality environment;
graphically representing to the user, within the mixed-reality environment, one or more changes necessary to configure the mixed-reality environment to reproduce a user-selected sample sound; and
playing the modulated sound effect to the user.

8. The computer system of claim 7, wherein the modulating is performed dynamically in response to the virtual object being created or edited by the user.

9. The computer system of claim 7, further comprising:
modulating the sound effect to simulate one or more acoustic effects of a setting or condition of the mixed-reality environment modified by the user.

10. The computer system of claim 9, wherein the modulating is performed dynamically in response to the user modifying the setting or condition of the mixed-reality environment.

11. The computer system of claim 7, wherein the mixed-reality environment comprises a multi-user collaborative environment, and wherein a plurality of participating users are enabled to position or edit the at least one virtual object.

12. The computer system of claim 7, wherein the modulating is based on a created knowledge corpus.

13. A computer program product for operating a mixed-reality device, the computer program product comprising:
one or more computer-readable tangible storage medium and program instructions stored on at least one of the one or more tangible storage medium, the program instructions executable by a processor to cause the processor to perform a method comprising:
recording a sound effect occurring externally to a mixed-reality environment experienced by a user operating the mixed-reality device;
identifying one or more objects within the mixed-reality environment, including at least one virtual object;
modulating the sound effect to simulate one or more acoustic effects of the one or more objects within the mixed-reality environment;
graphically representing to the user, within the mixed-reality environment, one or more changes necessary to configure the mixed-reality environment to reproduce a user-selected sample sound; and
playing the modulated sound effect to the user.

14. The computer program product of claim 13, wherein the modulating is performed dynamically in response to the virtual object being created or edited by the user.

15. The computer program product of claim 13, further comprising:
modulating the sound effect to simulate one or more acoustic effects of a setting or condition of the mixed-reality environment modified by the user.

16. The computer program product of claim 15, wherein the modulating is performed dynamically in response to the user modifying the setting or condition of the mixed-reality environment.

17. The computer program product of claim 13, wherein the mixed-reality environment comprises a multi-user collaborative environment, and wherein a plurality of participating users are enabled to position or edit the at least one virtual object.

* * * * *